United States Patent [19]

McGraw

[11] Patent Number: 5,222,772
[45] Date of Patent: Jun. 29, 1993

[54] CONNECTOR FITTINGS AND METHOD OF CONNECTING SAME

[76] Inventor: Doonan D. McGraw, 245 St. James Way, Naples, Fla. 33942-6715

[21] Appl. No.: 464,284

[22] Filed: Jan. 12, 1990

Related U.S. Application Data

[63] Continuation-in-part of Ser. No. 346,473, May 2, 1989, Pat. No. 4,893,846.

[51] Int. Cl.⁵ ............................................. F16L 33/22
[52] U.S. Cl. ..................................... 285/323; 285/243; 285/246; 285/255; 29/508
[58] Field of Search ............... 285/323, 346, 353, 393, 285/392, 243, 246, 247, 250, 255, 240, 248, 249, 334.1, 334.2, 334.3, 334.5, 389, 385, 322; 29/508, 506

[56] References Cited

U.S. PATENT DOCUMENTS

| | | | |
|---|---|---|---|
| 3,361,460 | 5/1966 | Jansen | 285/323 X |
| 3,479,058 | 11/1969 | Chandler | 285/246 X |
| 3,756,632 | 9/1973 | Riggs et al. | 285/250 |
| 4,005,884 | 2/1977 | Drori | 285/323 |
| 4,188,051 | 2/1980 | Burge | 285/323 X |
| 4,893,846 | 1/1990 | McGraw | 285/177 X |

FOREIGN PATENT DOCUMENTS 1021679  3/1966  United Kingdom ............... 285/323

Primary Examiner—Eric K. Nicholson

[57] ABSTRACT

A connector fitting of the cantilever camming and clamping type having a ferrule secured in the main body bore thereof, the ferrule having an end received in one end of a tubular, usually plastic, member as the tubular member is installed. The ferrule provides radial force backup preventing collapse of the tubular member. It seals with the bore of the main body and with the tubular member. The cap bolt part of the fitting may have a tapered or a straight inner surface arranged to engage the outer wall of the tubular member in gripping relation.

11 Claims, 2 Drawing Sheets

1

CONNECTOR FITTINGS AND METHOD OF CONNECTING SAME

CLAIM OF PRIORITY

Priority of invention is hereby claimed, based on the invention disclosed in prior filed, copending U.S. patent application Ser. No. 07/346,473, filed May 2, 1989 by the herein named inventor, entitled "Connector Fittings" and issued as U.S. Pat. No. 4,893,846 on Jan. 16, 1990. This application is a continuation-in-part of the earlier filed application on which claim of priority is based.

FIELD OF THE INVENTION

The invention herein disclosed and claimed includes modifications of the invention claimed in the above identified patent application on which a claim of priority is based and of which this application is a continuation-in-part.

The invention herein disclosed and claimed relates to connector fittings for one or more cylindrical members and a method of connecting them with tubular member in particular. At least one of the cylindrical members is a tubular member, preferably made of a flexible plastic material such as vinyl or polypropolene by way of example. The other member or members may be a similar tubular plastic member, or may be pipes, tubes, rods, or other types of members. Fittings embodying the invention may connect a tubular plastic member to another body of a different type, or may connect two or more tubular plastic members together. Such connections may be a coaxial arrangement, an angular arrangement, or any combination of such arrangements. When such connections are made for pipes, tubes or rods, arrangements in addition to the straight in-line or coaxial arrangement include tees, elbows, U-connections, X-connections, and the like. Fittings may include shut-off or other valves, gages, etc., built in the fitting main body as a part of the connector fitting.

A connector fitting embodying the invention comprises a nut or main body, a cap bolt for each cylindrical member to be connected by the fitting, and for each tubular plastic member a ferrule having one end provided with an outer taper and the other end press fitted or otherwise sealingly secured in a bore of the main body. In one embodiment the segmented cap bolt which is used with a tubular plastic member also has an inner tapered bore portion corresponding to the outer taper of the ferrule. As disclosed in the above-noted patent application, a particular type of fitting clamping arrangement is used, which is sometimes referred to as a cantilever clamping action fitting. The type of fitting employed is a quick connect and quick disconnect fitting which seals any fluid in any tube or pipe with which it is employed against pressure loss.

BACKGROUND OF THE INVENTION

Numerous tube or pipe couplings or fittings are known in the art, some of them which have quick connect and quick disconnect features. Examples are found in many patents, some typical ones being those noted here. U.S. Pat. No. 4,124,235—Grahl et al, issued in November, 1978, is typical of a threaded body and nut arrangement having a wedge-like metal sleeve which is tightened in gripping relation with a tube extending therethrough as the nut is threaded on the external threads of the body. U.S. Pat. No. 1,615,233—Redlinger, issued in January 1927, is typical of some cantilever clamping action fittings using tapered threads to cause the cantilever clamps to engage the pipe or other cylindrical member being gripped. U.S. Pat. No. 4,544,186—Proni, issued in October of 1985, shows a similar clamp action fitting in which a fitting body has split ends provided with external threads. An internally threaded nut is threaded over the split ends. When the nut is threaded on the split ends until it bottoms out on a flange on the fitting body, the threads force the main body split ends into clamping engagement with a tube or pipe. U.S. Pat. No. 3,499,671—Osborne, issued in March of 1970, shows another coupling for a tube without using flared ends, and includes a deformable metal sleeve between a nut and body having threaded engagement with each other.

It is typical of such prior art when threads or other camming surfaces are used that the threads or camming surfaces are exposed to contaminants or physical damage during handling and transport, as well as while being used as a coupling or connector. Others are not preassembled, and then attached to cylindrical members in clamping fashion without some disassembly or with only a minimum of securing action. Some do not provide adequate sealing arrangements to handle higher fluid pressures in the tubes or pipes which are connected by them.

In the patent application noted above and of which this application is a continuation-in-part, a nut main body has internal camming surfaces formed by on a bore or recess inner surface. A cap bolt has a through bore, a bolt head, and a longitudinally segmented shank defining axially extending clamping legs. External camming surfaces, defined by threads on the ends of the clamping legs which are remote from the bolt head, fit within the internal camming surfaces of the nut main body with the bolt head engaging the nut main body so that the internal and external camming surfaces are contained within the nut main body and protected against physical damage during transport and handling. A cylindrical member, which may be a pipe, tube, rod or other device, fits through the cap bolt bore in snug but relatively movable relation, and extends at least into the nut main body recess axially beyond the internal camming surfaces. It is preferred that the nut main body have a passage or bore of which the recess having the internal camming surfaces are a part, with the cylindrical member extending at least partially into the nut main body passage or bore axially inward of the recess internal camming surfaces. The cap bolt is then further tightened, but cannot move axially further into the recess because of the engagement of the bolt head and the end of the nut main body. This causes camming action of the camming surfaces to occur, creating forces acting radially inward on the clamping legs at their ends with the external camming surfaces formed thereon, causing them to be resiliently bent in cantilever fashion to clampingly grip the cylindrical member. It is preferred that suitable seals be provided to keep the camming surfaces further protected, and to hold fluid pressures which may later be introduced into the pipe, tube or other fluid-conducting cylindrical member. It is also preferred that stop means be provided in the nut main body to locate the end of a cylindrical member at the appropriate position in the nut main body. Such stop means may be one or more shoulders positioned for abutting relation with the end of cylindrical members, or a removable C-clip in an internal groove in the passage or bore of the nut main body, or the end of another cylindrical member already positioned and clamped in place in the nut main body. The last noted stop means is particularly effective when two cylindrical members of different outer diameters are being connected by a fitting embodying the invention, with the larger one of the cylindrical member ends acting as an abutting stop for the smaller one, the larger one having been previously located by a shoulder in the nut main body passage or bore.

SUMMARY OF THE INVENTION

Fittings embodying the invention herein disclosed and claimed are particularly adapted to providing a connection with at least one tubular plastic member. Specific structure added to or modifying the structure of the above-noted patent application of which this application is a continuation-in-part overcome a problem in trying to connect relatively soft, flexible tubular members such as those made of vinyl or polypropolene, by way of example. Like those disclosed in the above-noted patent application, they may be axially extending or angularly formed, may clamp cylindrical members at two nut main body ends to join two such members together, or may have a pipe thread at one end opposite one cap bolt so that the fitting is secured to a tank or other fluid-containing device with a pipe or tube being connected to the tank interior by the fitting. Other modifications may include tees, elbows, and X-shaped nut main bodies. Different size cylindrical members may be joined by a single fitting. In all arrangements the camming surfaces are so contained as to be protected against physical damage during handling, transport, installation and use. It is also preferred that those surfaces be so protected against contaminants by the use of shipping seals until they are ready to be installed, and then by the cylindrical member or members as seals after installation and during use. In the particular arrangements herein disclosed and claimed, the tubular plastic member being connected will also function as a seal against contaminants as well as sealing the fitting against leakage.

DETAILED DESCRIPTION

Figure 1:
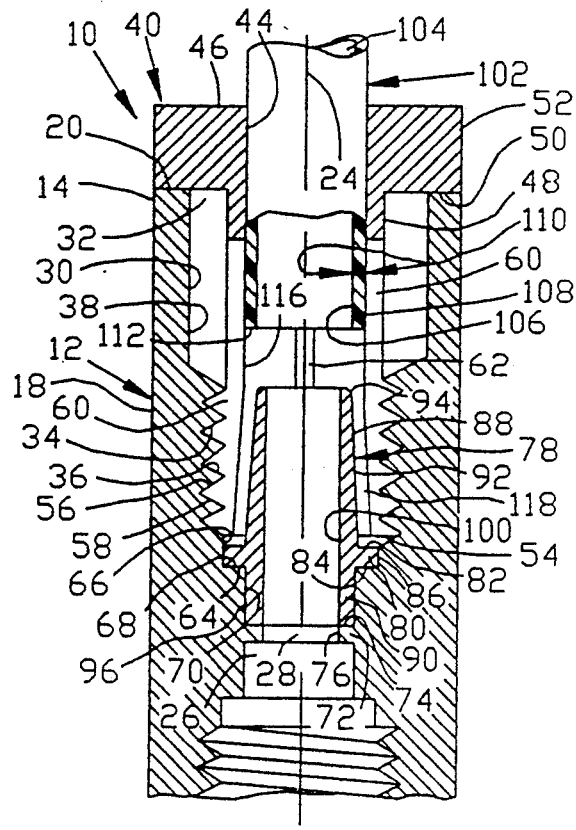
FIG. 1 is an elevation view of a fitting showing one embodiment of the invention, with parts broken away and in section. The fitting is shown during the first step of the installation wherein a tubular plastic member is being secured to the fitting.
Figure 2:
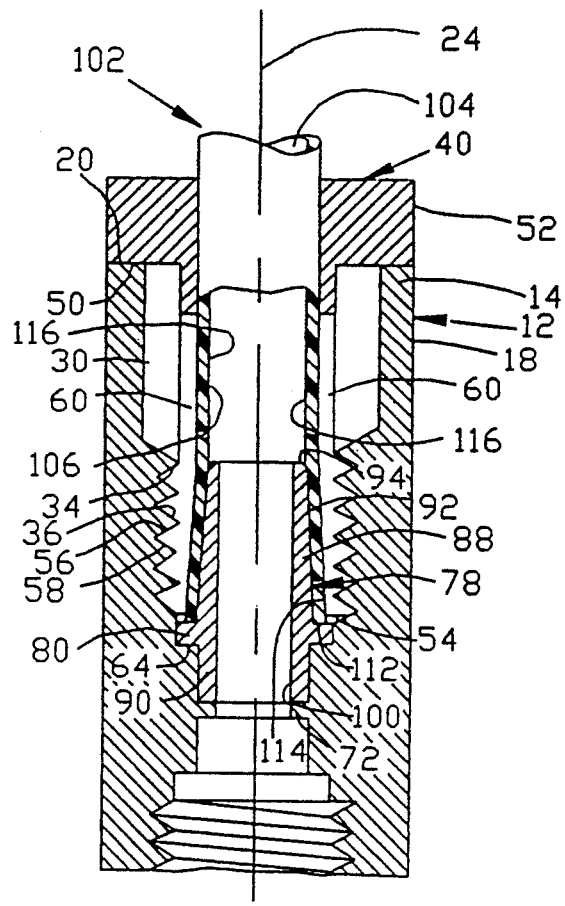
FIG. 2 is also an elevation view of the fitting of FIG. 1, with parts broken away and in section. It shows a tubular plastic member installed, with the fitting in clamping and sealing relation with the tubular plastic member.
Figure 3:
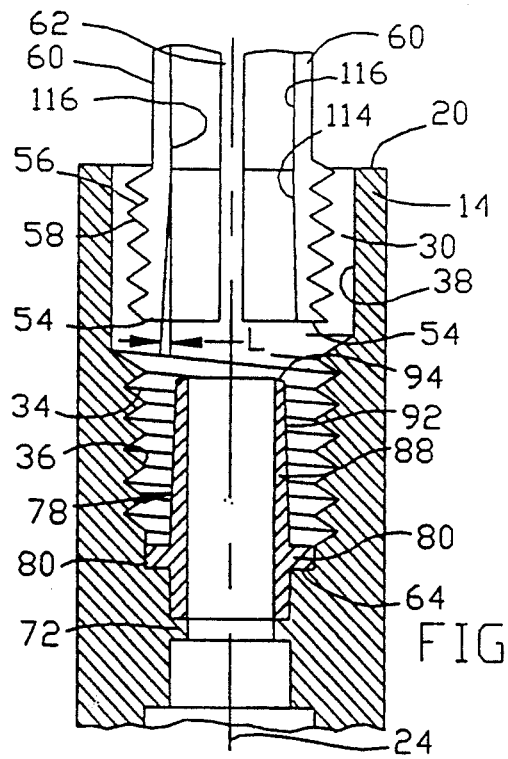
FIG. 3 is a cross section view taken of the main body, cap bolt and ferrule of the fitting of FIGS. 1 and 2, in an exploded or pre-assembly arrangement.

The fitting 10 of FIG. 1 is of the type in which either one cylindrical member or two cylindrical members may be received and clamped by the fitting. The same fitting is illustrated in FIGS. 2 and 3, with some reference characters omitted so as to minimize clutter of reference characters and lead lines. For simplicity, no cylindrical member is shown as being to one end of the fitting. It is to be understood, however, that such second cylindrical member may be received and clamped by the fitting, and that such second cylindrical member may be another tubular plastic member, a tube made of metal such as copper or steel or other similar material, a pipe or a rod.

Fitting 10 has a nut forming the fitting main body 12. The exterior of the main body is defined by opposed ends, one being shown and identified as end 14. The main body outer side wall 18 may be hexagonal, like the fitting main body of the above-noted patent application, to provide a good tool purchase for installation and removal of the cylindrical members. It may also have other shapes. For example, it may be circular, with oppositely disposed flat surfaces formed on a suitable part such as at the center section. The particular arrangement to provide a good tool purchase is not a part of the invention.

The end of the main body not shown because it has been broken away is usually constructed in mirror image to the end 14. End 14 has an end outer surface 20. This surface is illustrated as being perpendicular to the fitting axis 24, but are not required to be so. For example, they may be somewhat conical, in either a convex or concave manner. Such variations are being more fully disclosed and claimed elsewhere, and are there not further shown or described here.

The bore of main body 12, identified in FIG. 1 as bore 26, can be better seen in FIG. 3. As noted above, some reference characters and lead lines shown in FIG. 1 are omitted in FIGS. 2 and 3 to minimize clutter. It has an axially central portion 28 of a diameter commensurate with the inner diameter of the cylindrical members to be received, and two progressively larger diameters as will be further described. Bore 26 is provided with a recess 30 in its illustrated outer end. The bore end not shown is provided with a similar recess. These recesses are larger in diameter than the diameter of the axially center portion 28 of the bore. Since these recesses are preferably identical but oppositely disposed, only recess 30 is shown, and only it will be described in further detail.

Recess 30 has its outer end 32 opening through nut main body end surface 20 and its inner end terminating at the bore axially central portion 28. Internal camming surface 34, defined by an internal thread 36, is formed on about the axially inner half of recess 30. Cross section segments of internal thread 36, as seen in FIGS. 1-3, are generally triangular so that the camming surface 34 is a spiral surface located on the lower side of the thread 36. Camming surface 34 extends upwardly from the inner end of the recess, or from a point immediately adjacent thereto, to the recess outer end 32, and also extends inwardly from the side wall 38 of the recess. The camming surface 34, when seen in cross section as shown in FIG. 1-3, is therefore oblique to the axis 24. While the other side of the thread 36 is a similar but reversely angled surface, it functions primarily only as a thread surface for the usual threading action to be described.

The axially outer half of the recess side wall 38 is not threaded, and has a diameter at least as large as the root diameter of the thread 36 forming the internal camming surface 34 so that a mating external thread, when inserted in that part of the side wall 38, may axially pass by it without requiring any threading action. FIG. 3 clearly illustrates this relationship. This decreases preassembly time. The internal camming surface 34 is not needed or desired in this area because the camming action should occur near the recess inner end rather than near the recess outer end 32. This provides a longer moment arm for the most effective cantilever action and clamping force with a given force exerted.

Fitting 10 also has cap bolts at the opposite ends of nut main body 12. One such cap bolt 40 is shown. These cap bolts are also structurally comparable, and usually even dimensionally identical, to each other, and therefore only cap bolt 40 is shown and described in greater detail. It is to be understood, however, that the cap bolt of FIGS. 6-8 may be used in this other main body end. Also, when the cylindrical member being secured in the other end of the main body is a hard, relatively solid and unyielding member such as a copper or stainless steel tube or pipe, the ferrule to be described with regard to FIGS. 1-5 may be eliminated so that the arrangement is like that of the above-noted patent application. Of course, with that arrangement seals such as the O-ring seals employed in that disclosure will be used when needed. The other cap bolt so employed bears the same relationship to nut main body end surface 22 and to the recess comparable to recess 30 as does cap bolt 40 to nut main body end surface 20 and recess 30. It and its recess may at times be of a different size from cap bolt 40 and recess 30.

Cap bolt 40 has a bore 44 extending therethrough, with bore 44 being coaxial with the fitting axis 24 when assembled to and within nut main body 12. Cap bolt 40 includes a bolt head 46 and a bolt shank 48 extending axially from one of the axially spaced side surfaces 50 of bolt head 46. Bolt head 46 has a laterally positioned side exterior surface 52 also shaped for good tool purchase. As illustrated in the above-noted patent application, it may be hexagonal and of the same size as the hexagonal exterior side surface 18 of the nut main body 12. It is not necessarily identical in shape and size as the main body exterior side surface 18, however.

As shown in FIGS. 1 and 2, the bolt head surface 50 is in surface mating engagement with the nut main body end surface 20 when the cap bolt is in its installed position for fitting transport and in use.

Cap bolt shank 48 is annular since bore 44 also passes axially through it. The shank end 54 remote from bolt head 46 terminates so that it is of a somewhat shorter axial length than the axial length of recess 28 from nut main body surface 20 to the recess inner end, effectively preventing the shank end 54 from engaging any part of the axially central portion 28 of bore 26.

External camming surface 56 is formed by an external thread 58 on shank 48 so that it extends from the shank remote end 54 axially toward bolt head surface 50, but preferably terminates at about the same distance from surface 50 that camming surface 36 terminates relative to the nut main body outer end 20. The remaining axial portion of shank 48 from the termination of thread 58 to the cap bolt head surface 50 is preferably of about the same diameter as the root diameter of thread 58. As described to this point, shank 48 is essentially an externally threaded annular extension from the bolt head 46. However, it is divided into several longitudinally extending segments or legs 60 by slots 62. These slots extend from the shank outer end 54 through the camming surface 56 and also through most of the shank length, stopping immediately adjacent to, yet preferably spaced from, bolt head surface 50. Shank segments 60 may therefore be identified as cantilever shank legs. In the illustrated construction, there are four slots 62 and therefore four shank segments or legs 60. Some other applications or fitting constructions may use more or less shank legs. If less are used, the slots 62 are then considerably wider arcuately so that the shank legs are sufficiently arcuately narrow to still function as resilient cantilevers. This would lessen the maximum obtainable clamping action, and should not be used where high clamping forces are required. It is more likely that more shank legs will be preferred. Since the cross section views of the cap bolt 40 in FIGS. 1-3 are taken along a line or in a plane passing through two oppositely positioned slots 62, the two shank legs of cap bolt 40 as seen in FIG. 2 are not in section, but are shown in elevation.

Referring now to main body bore 26, and particularly its axially central portion 28, a shoulder 64 is formed in bore 26 at the inner end of recess 30. Bore 26 has a side surface 66 adjacent shoulder 64. Shoulder 64 is defined by an axially facing annular surface 68. Another bore side surface 70, of smaller diameter than bore side surface 66, is on the other axial side of shoulder 64 from side surface 66. A center flange 72 is formed at the center of the bore axially central portion 28. Flange 72 has an axially facing surface 74 facing axially toward recess 30. The bore 26 has a section 76 which passes through flange 72.

A ferrule 78 is provided so that the interior of the tubular plastic member has a backing surface against which clamping forces being applied through the tubular wall by the cantilever legs will secure and seal the tubular plastic member to the fitting rather than collapse it as the cap bolt it tightened. The ferrule 78 also seals the bore 26 of the main body relative to the interior passage of the ferrule through which fluid may be conducted. It acts as a guide for the installation step in which the plastic tubular member is inserted into its installed position.

Ferrule 78 is generally tubular in shape, and is preferably made of a stiff, hard material. While it may be made of a plastic such as certain nylons, it is usually made of metal having the same, or slightly greater, coefficient of expansion as the main body, assuming that the main body is made of metal. Of course, in some installations, the main body as well as the ferrule may be made of a hard plastic. The particular plastic material used will depend upon the temperatures and pressures to be encountered, the fluid being conducted through the fitting, the environment in which the fitting is used, and the characteristics of cooperating structure such as shut-off valves, solenoid controls, electronic sensors, etc.

Ferrule 78 has an exterior center flange 80 defined by oppositely disposed axially facing surfaces 82 and 84 and a side surface 86. The diameter of the flange at side surface 86 is slightly larger than the diameter of the main body bore side surface 66 adjacent shoulder 64, so that the ferrule flange 80 is press fitted into the main body with surfaces 64 and 86 being in press fit relation when the ferrule is installed. The ferrule flange axial surface 84 is in full surface engagement with the axial surface 68 of shoulder 64 when the ferrule is installed.

Figure 4:
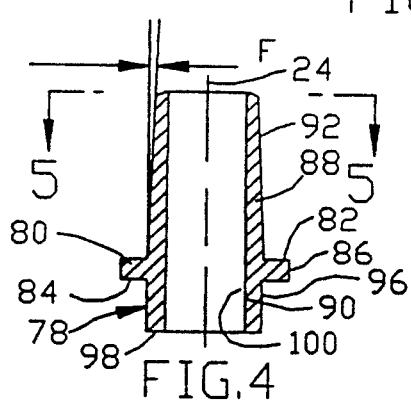
FIG. 4 is a cross section view of the ferrule of the fitting shown in FIGS. 1-3.
Figure 5:
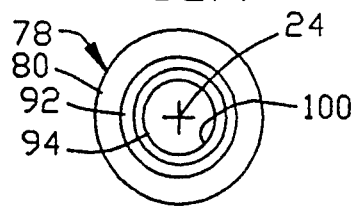
FIG. 5 is an end view of the ferrule of FIG. 4, taken in the direction of arrows 5—5 of that FIGURE.

The ferrule 78 has one end 88 extending from side 82 of flange 80 and another end 90 extending from the other side 84 of flange 80. Ferrule end 88 has a has tapered outer surface 92, tapered throughout its length at a convergent angle F relative to the axis 24, as shown in FIG. 4. End 88 terminates in a rounded or more sharply tapered end surface 94. Ferrule end 90 has a lateral outer surface 96 and an axial end surface 98. It is preferred that surface 96 also be slightly larger in diameter than bore surface 70 of the main body so that these surfaces are also in press fit relation when the ferrule is installed. It is recognized that the ferrule may also be installed by the heat-shrink method in which the main body is heated relative to the ferrule until the ferrule will fit easily into the bore 26. As the main body and the ferrule reach a common temperature, the main body shrinks relative to the ferrule and the press fit is accomplished. When the ferrule is in its installed position, its axial end surface is preferably in full surface engagement with the axial surface 72 of main body flange 74.

The ferrule 78 has an axially extending bore 100 formed therethrough. When ferrule 78 is installed in the main body 12, the axis of the ferrule bore is coaxial with the axis 24 of the main body, and therefore the same reference character is used to identify the axis of the ferrule. The diameter of the ferrule bore 100 and the diameter of the axial surface 74 of main body flange 72 are preferably the same so that flow turbulence in this area is minimized. The length of ferrule end 88 is also preferably such that it terminates near the outer end of the internal thread 36 of the main body when the ferrule is in its installed position. However, this relative location may be modified as desired and needed.

The tube 102 is a plastic tube having resilient characteristics which make it difficult to clamp with sufficient holding power without some type of backup. The ferrule 78 not only provides this backup, but also acts as a tube guide and a tube end expander during tube installation. Tube 102 has a tube passage or bore 104 defined by the tube inner wall 106. It has an outer wall 108, and the tube wall thickness 110 is the difference in the radii of the inner wall 106 and the outer wall 108. The tube has an end 112 which is inserted into the bore of cap bolt 44 at its head end as installation is begun, as shown in FIG. 1.

Figure 6:
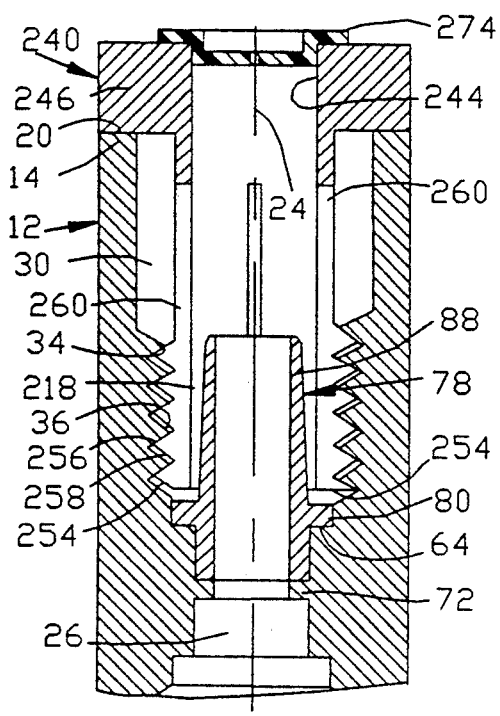
FIG. 6 is another cross section view with parts broken away, showing a modification of the fitting of FIGS. 1-4. The fitting is illustrated in its transport condition, with shipping seals or caps in place.
Figure 7:
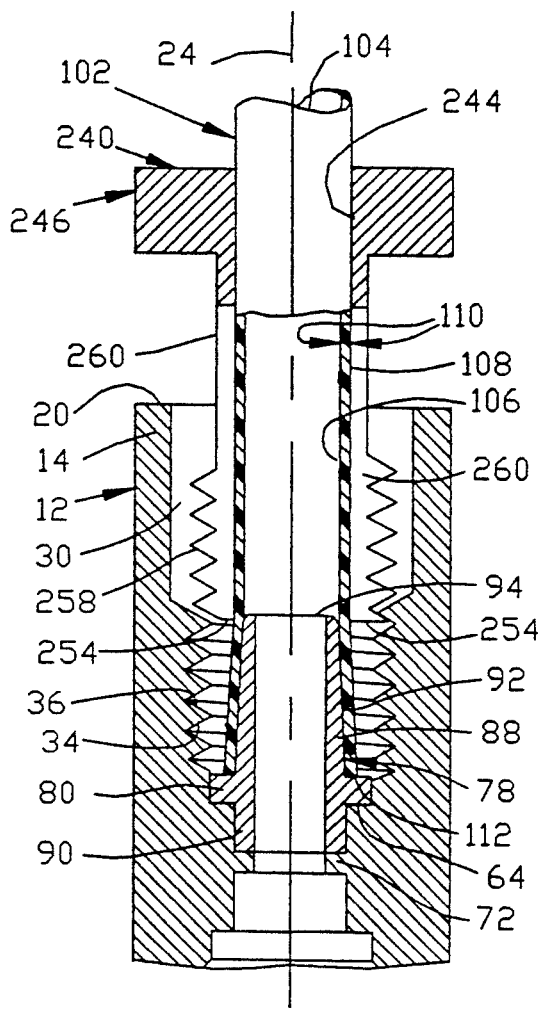
FIG. 7 is a cross section view with parts broken away, showing the fitting of FIG. 6 in its partially assembled and installed position. It is similar to that of FIG. 1.
Figure 8:
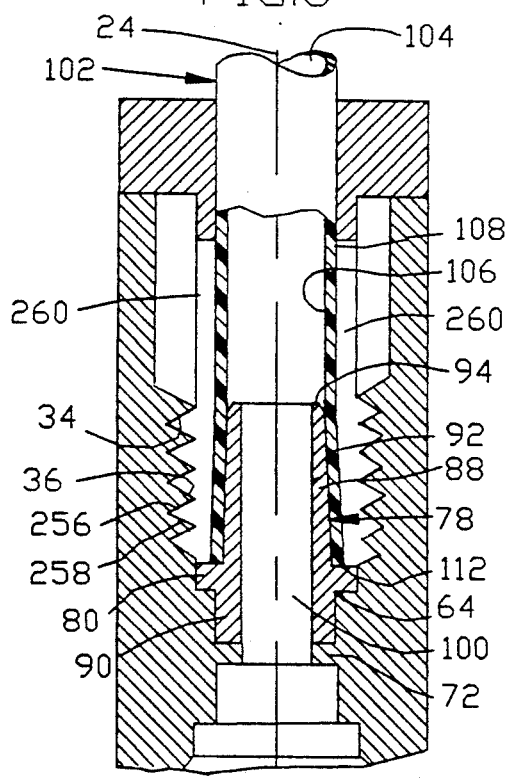
FIG. 8 is another cross section view with parts broken away. It is similar to that of FIG. 2, and shows the fitting of FIG. 6 in its fully installed position, with one tubular plastic member being connected.

In the arrangement embodying the invention as shown in FIGS. 1-3, the cap bolt 40 is also modified when compared to the cap bolt of the above-noted patent application. In the arrangement embodying the invention as shown in FIGS. 6-8, the cap bolt is constructed in the same manner as the cap bolt of the above-noted patent application.

The shank 48 and cap bolt head 46 of cap bolt 40 have straight inner wall sections 116 defining the cap bolt bore 44 from the bolt head surface 52 to a point near the beginning of the shank external thread 58. The inner wall sections are then outwardly tapered to define inner tapered surfaces 114. This taper is at an angle L. Angle L is equal to or slightly greater than angle F. For example, if angle F is 4.0°, angle L is 4.0° to about 5.0°. This arrangement is considered to be within the term of one taper angle being commensurate with the other taper angle. The axial length of inner tapered surfaces 114 is as long as or slightly longer than the axial length of the ferrule tapered surface 92, at least to the extent that when the cap bolt 40 and the ferrule 78 are in their installed positions the end surface 94 of ferrule 78 is still concentrically within the inner tapered surfaces 114. In this positions as shown in FIG. 1, the ferrule tapered outer surface 92 and the cap bolt shank inner surfaces 114 define a slightly conical annular space 118. The radii of the two tapered surfaces 92 and 114 are such at any selected axial point the difference between them is at least equal to the tube wall thickness 110 when the cap bolt 40 and the ferrule 78 are in the installed position and before the tube 102 has been inserted.

The camming surfaces 34 and 56 are well protected against contaminants. By use of shipping caps in the outer ends of the cap bolt bore 44, contaminants are kept out of the recesses and therefore away from the camming surfaces, during handling and transport. One such shipping cap 274 is shown in FIG. 6. These shipping caps are preferably removed only immediately prior to insertion of the cylindrical member or members to be clamped. Therefore at various times the camming surfaces are substantially always protected against contaminants by sealing means, which at times include the sealing caps and, at other times, instead include the cylindrical member or members being clamped. As more fully disclosed in the above-noted patent application, the sealing means may, but does not necessarily, include the O-ring seals in the cap bolts and the main body. As noted therein, these seals are not necessary when the cylindrical member or members are rods or do not conduct fluid under pressure. Also, when the cylindrical member being connected is a tubular plastic member and the claimed inventive structure is employed, the tube itself, together with a press fit of the ferrule used, provide the necessary sealing against pressure loss as well as against contaminants.

The fitting 10 is normally preassembled by first press fitting the ferrule 78 in place, and then inserting the cap bolt as shown in FIG. 3, the cap bolt being tightened when it threadedly engages the main body to the extent shown in FIG. 2. Cap bolt 40 is threaded in place so that its bolt head is in light forcible surface engagement with the nut main body end surface. This surface engagement, together with the similar surface engagement of the other cap bolt and the shipping caps in position in each cap bolt as shown in FIG. 6, fully protect the camming surfaces 34 and 56, and their associated threads 36 and 58, as well as the walls of the bore sections, keeping them free of contamination by dust and dirt, etc., and protecting them against physical damage due to external forces accidentally being exerted on them.

The more common use of the fitting 10 is in the connection of two pipes or tubes, as shown in FIG. 2 with one such tube being a plastic tube. The other pipe or tube is not shown for simplicity. The cap bolt need not be removed or loosened from its threaded engagement with the main body in order to install and secure the tube 102. The shipping cap is removed, and tube end 112 is inserted through the cap bolt bore 44 and recess 30 until it engages the ferrule rounded or highly tapered end surface 94. Surface 94 is slightly smaller in diameter than the inner diameter of the tube so that the tube end 112 fits over the ferrule end and is guided into the or conical annular space 118. The tube 102 is then pushed so that the tube end moves over the ferrule tapered surface 92, expanding or stretching circumferentially as it does so, until the tube end 112 engages the ferrule flange axial surface 82 as shown in FIG. 2. The cap bolt 40 is then tightened so that the thread-formed camming surfaces 34 and 56 cause the cap bolt legs 60 to move in a cantilever manner inwardly, engaging the tube outer wall 108 in gripping relation. Since the ferrule within the tube resists any radially inwardly directed forces tending to collapse the tube, the tube is tightly gripped between the cap bolt legs 60 and the ferrule. The portions of the tube which are so engaged by the cap bolt legs 60 are radially compressed, while the other parts of the tube are not so compressed. Thus the extreme outer end of the tube end 112 which, as seen in FIG. 2 is not so engaged, will not be compressed, and will be somewhat larger in outer diameter than the inner diameter of the cap bolt bore at the leg outer ends 54. This will further resist any axial removal of the tube.

The tube fit in the cap bolt head is usually sufficiently close as to seal the recess 30 against contaminants. However, if needed, a seal such as the O-ring seal disclosed in the above-noted patent application may be installed in a groove of the cap bolt head for this purpose. The tapered tube-expanded fitting of the tube to the ferrule, and the additional gripping force exerted radially inwardly which adds to this surface fitting, seals the interior of the tube and the ferrule against fluid leakage. Therefore no additional seal is needed for this purpose. The press fit of the ferrule in the main body seals it against fluid leakage, and no other seal is needed. It is recognized, however, that in some instances it may be desired that the ferrule not be press fitted into the main body, but that it be more easily removed and installed. In such a case, a seal between the ferrule and the main body would be employed, preferably engaging the outer surface 96 of ferrule end 90.

Different plastic tubes may be accommodated by appropriate sized ferrules and cap bolts. For example, several tubes may have the same outer diameter, but different tube wall thicknesses. Then only the ferrule need be of a size to properly accommodate the tube inner wall 106. The diameter of the cap bolt shank bore may be of several different sizes to accommodate different tube outer wall diameters.

The modification shown in FIGS. 5-8 permits the use of the same type of cap bolt as disclosed in the above-noted patent application of which this application is a continuation-in-part, and employs the same ferrule 78 as in FIGS. 1-5. Cap bolt 240 has a straight bore 244 throughout, instead of having the tapered inner surfaces 114 of the cap bolt legs. This results in a slightly decreasing taper of the annular space 218, as seen in FIG. 6. In order to accommodate the tube wall thickness, the external thread 258 on the cap bolt legs 260 is radially smaller than the internal thread 36 of the main body 12.

At the beginning of installation, the shipping cap 274 is removed, and the cap bolt 240 is threaded out of the main body as shown in FIG. 7. The tube 102 is inserted through and beyond the cap bolt bore 244 until it extends beyond the leg ends 254 at least as far as the ferrule end 88 is long. The tube and the cap bolt are then moved axially so that the tube engages and fits over the ferrule tapered end 88 until it engages the ferrule flange. This is the partially installed situation illustrated in FIG. 7. The cap bolt 240 is then moved axially until its thread 258 can be threaded into the main body internal thread 36. The cap bolt 240 is then threaded to the position shown in FIG. 8. As it is threaded, the taper of the ferrule having caused the outer wall of the tube to be similarly tapered, causes the cap bolt legs to move outwardly in a cantilever manner to fit this taper. This is accommodated by the difference in diameters of the internal and external threads. Once the cap bolt head 246 is seated on the end surface 20 of the main body, further tightening action of the cap bolt causes the camming surfaces formed by the threads 36 and 258 to cam the legs 260 into gripping engagement with the tube. The gripping action, compression of the tube, and sealing action are then substantially the same as more fully described with regard to FIGS. 1-3. While the assembly procedure is slightly more time consuming with this modification, it does permit simpler machining operations on the cap bolts.

Because, in the arrangement of FIGS. 1-3, the cap bolt 40 is already threaded into the nut main body 12 until surfaces 20 and 50 are in engagement, the cap bolt cannot actually be moved axially further into the nut main body bore 26 by such action. Instead, the camming surface 34 of the shank legs will move arcuately relative to the camming surface 56 of recess 30, causing tensile forces to be exerted along the shank legs 60. Camming action results, with a force vector which moves the outer ends of the shank legs 60 in a resilient cantilever action inwardly, causing the inner surfaces of the shank legs in the axial area of the camming surface 36 to grip and clamp the tube outer surface wall 108.

It has been found, with a typical National Course thread defining the camming surfaces, that only about one-tenth of a turn of the cap bolt 40 is usually required to obtain full clamping action which will hold a one-half inch copper or stainless steel tube against axial removal and in proper sealing relation under pressures normally encountered. The amount of arcuate turning required will vary to some extent due to any variations in the difference in the radius of the cylindrical member and the radius of the cap bolt bore, since that difference determines the distance that each of the shank leg ends must move radially inward to clamp the cylindrical member. Other factors affecting this are the pitch of the threads forming the camming surfaces and the fit of the camming surfaces to each other before clamping action is initiated.

When working with plastic tube members, however, there is additional turning required, usually on the order of about 60°, to fully secure the tube in place because of the radial compression of the plastic tube and plastic flow as radial forces are exerted on it.

In the modification of FIGS. 6-8, the cap bolt would have to be threaded through several turns (typically five or six) before the cab bolt head engages the main body. After that it would have to be turned about an additional 60° to secure the tube in place.

Pressures in various hydraulic pressure systems such as those used in air conditioning systems, fuel lines, oil lines, water lines, gas lines, sewer lines, vacuum lines, and other conduits may be readily accommodated. There are numerous applications in plant equipment and machinery and other plant or building installations. Fittings embodying the invention may be used in these applications as well as others ranging from engine cooling and exhaust systems to medical equipment, for example.

They may be made of various materials, depending on the required pressures, the possible chemical reactions between the fluids being conducted and the material of the fittings, and the material of which the cylindrical members are made so that there are no adverse reactions, by way of example. The environment in which the fittings and cylindrical members are to be used must also be considered. A corrosive atmosphere or fluid being conducted, or immersion in a hostile environment such as salt water would require materials designed for such use. Certain plastics are particularly adapted to such uses, as well as in low pressure systems.

The fittings are also adapted to being made of injection-molded plastic such as nylon for use with small plastic tubes, or of PVC for use with PVC piping that is now so common in household water and sewer systems. When used with plastics such as PVC which are not sufficiently elastic to expand as they are installed on the ferrule, the ferrule end 88 may be straight rather than tapered, and have an outer diameter no greater than the inner diameter of the tube or pipe.

In many instances the fitting main bodies and cap bolts may be machined from bar stock, using appropriate metals and alloys such as brass, aluminum, bronze, and stainless steel. In other instances the main body may be cast of appropriate metal and machined as needed.

I claim:

1. In a fitting of the cantilever clamp action type in which the cantilever clamping action is obtained by cooperative internal and external cam threads, the fitting being constructed and arranged to have said threads protected against contaminants and accidental impact damage during normal handling, transport, attachment to at least one cylindrical member, and in its installed position, the fitting comprising:

a fitting main body having a recess therein provided with an internal thread in axially inwardly spaced relation to the opening of said recess;

a cap bolt having a bore therethrough, a head, and a longitudinally segmented shank extending axially from said head and provided with an external thread at the outer end thereof in axially spaced relation to said head so that said shank is fully received in said main body recess when said cap bolt is threaded into said main body until said head engages said main body at the recess opening to prevent further movement of said cap bolt head axially toward said recess and fully contain said internal and said external threads protectively within said recess;

means sealing said cap bolt bore in the area of said head and sealing said fitting main body recess axially beyond said internal threads;

said threads having mating cam surfaces thereon cooperating in camming relation to move said shank segments in cantilever fashion inwardly when said cap bolt is rotated in a further inwardly threading direction and to thread-lockingly resist cap bolt rotation in the outwardly threading direction, said shank segments then being conditioned to grip a member received in said bore in the axial area of said external threads;

the improvement comprising:

a tubular member adapted to be so gripped by said shank segments and when so gripped extending through said cap bolt bore and constituting at least a part of said sealing means;

and a ferrule having a bore therethrough and positioned in said main body bore in coaxial bore alignment with said cap bolt bore, said ferrule having one end adapted to axially receive said tubular member thereover in sealing and radial force backup relation to said tubular member concentrically within said shank segment external threads;

said shank segments when gripping said tubular member compressing said tubular member against said ferrule one end in the area concentrically within said shank segment external threads, increasing the sealing action between said tubular member and said ferrule end.

2. The fitting of claim 1 in which said tubular member is a tubular plastic member and said ferrule one end is tapered so that its extreme outer end is received within the end of said tubular plastic member and as the tubular plastic member is moved axially over said ferrule one end the tubular plastic member expands concentrically to accommodate the taper of said ferrule one end.

3. The fitting of claim 2 in which said cap bolt shank segments have an internal tapered surface commensurate with the taper of said ferrule tapered one end and defining with said ferrule tapered one end, with said cap head in axial surface engagement with said fitting main body at the opening of said recess in said fitting main body and before said tubular member is inserted and said cap bolt is tightened so that said shank segments are gripping said tubular member to compress said tubular member against said ferrule and increase the sealing action between said tubular member at said ferrule end, a slight conical tapered space having an annular thickness defined by the difference in the radii of said surfaces at any one location being at least as much as the thickness of the wall of said tubular annular member.

4. The fitting of claim 2 in which said cap bolt shank segments have a straight internal surface and defining with said ferrule tapered one end a tapered thickness annular space when said cap bolt and said ferrule are installed in said main body for shipping and handling.

5. The fitting of claim 4 in which said cap bolt shank segment external thread has a maximum free standing diameter less than the maximum diameter of said main body internal thread so that when said cap bolt shank segments are threaded into said main body for shipping and handling the threads are threadedly engaged but have their respective maximum diameters spaced from each other at least to the extent that the tapered thickness annular space is of lesser thickness at any selected location than the thickness of the wall of said tubular plastic member.

6. The fitting of claim 1 in which said ferrule one end and said shank segments have respective concentrically spaced inner and outer surfaces providing an annular space therebetween when said ferrule and said cap bolt are installed for shipping and handling in said main body, said annular space being at least as radially thick as the radial thickness of the wall of said tubular member.

7. The fitting of claim 6 in which said inner surfaces of said shank segments have a constant diameter throughout the length of said shank segments.

8. A connector fitting having means connecting a tubular plastic member to said connector fitting, said connector fitting comprising:

a cap bolt provided with a bolt head, a bore through said cap bolt, and axially extending shank segments having an external thread camming surface thereon, said shank segments having a tapered internal surface formed by a section of said bore axially within said external thread camming surface;

a main body having a bore with a recess receiving said shank segments and having an internal thread camming surface thereon threadedly cooperating with said external thread camming surface, said cap bolt having a bolt head engaging one end of said main body, and a ferrule secured within said main body bore inwardly of said recess and having a tapered end extending within said internal thread camming surface in inwardly radially spaced relation thereto so as to receive said shank segments thereabout in spaced relation;

said tubular plastic member having one end inserted into said cap bolt bore and said main body recess and being circumferentially stretched to extend over said ferrule tapered end in surface engaging and sealing relation concentrically inward of said external thread of said shank segments, said cap bolt shank segments being cammed radially inward in cantilever bending relation when said cap bolt is further turned in a threading direction, said shank segments gripping said tubular plastic member and exerting radially inward forces thereon which are transmitted to said ferrule tapered end, said ferrule tapered end preventing collapse of said tubular plastic member in response to said radially inward forces.

9. A method of connecting a tubular plastic member to a connector fitting having a cap bolt provided with a bore and axially extending shank segments having an external thread camming surface thereon, said shank segments each having a tapered internal surface formed by a section of said bore axially within said external thread camming surface, a main body having a recess receiving said shank segments and having an internal thread camming surface thereon threadedly cooperating with said external thread camming surface, said cap bolt having a bolt head engaging one end of said main body, and a ferrule having a tapered end extending within said internal thread camming surface in inwardly radially spaced relation thereto so as to receive said shank segments thereabout in spaced relation, the steps comprising:

(1) inserting one end of said tubular plastic member in said cap bolt bore and receiving said ferrule tapered end therein in surface engaging relation with the tubular plastic member inner wall;

(2) moving the one end of said tubular plastic member axially over said ferrule tapered end, circumferentially expanding the portion of said tubular plastic member to accommodate said ferrule tapered end increase in diameter;

(3) and turning said cap bolt to cam said shank segments into gripping engagement with said tubular plastic member and radially force said tubular plastic member more tightly into surface engagement with said ferrule one end, sealing and gripping said tubular plastic member against leakage relative to said ferrule and against removal from said fitting main body.

10. A method of connecting a tubular plastic member to a connector fitting having a cap bolt provided with a bore and axially extending shank segments having an external thread camming surface thereon, said shank segments each having an internal surface formed by a section of said bore axially within said external thread camming surface, a main body having a recess receiving said shank segments and having an internal thread camming surface thereon threadedly cooperating with said external thread camming surface, said cap bolt having a bolt head engaging one end of said main body, and a ferrule having a tapered end extending within said internal thread camming surface in inwardly radially spaced relation thereto so as to receive said shank segments thereabout in spaced relation, the steps comprising:

(1) inserting one end of said tubular plastic member in said cap bolt bore and receiving said ferrule tapered end therein in surface engaging relation with the tubular plastic member inner wall;

(2) moving the one end of said tubular plastic member axially over said ferrule tapered end, circumferentially expanding the portion of said tubular plastic member to accommodate said ferrule tapered end increase in diameter;

(3) and turning said cap bolt to cam said shank segments into gripping engagement with said tubular plastic member and radially force said tubular plastic member more tightly into surface engagement with said ferrule one end, sealing and gripping said tubular plastic member against leakage relative to said ferrule and against removal from said fitting main body.

11. A method of connecting a tubular plastic member to a connector fitting having a cap bolt provided with a bore and axially extending shank segments having an external thread camming surface thereon, said shank segments each having an internal surface formed by a section of said bore axially within said external thread camming surface, a main body having a recess receiving said shank segments and having an internal thread camming surface thereon threadedly cooperating with said external thread camming surface and of larger thread maximum diameter than the maximum diameter of the external thread camming surface, said cap bolt having a bolt head adapted to engage one end of said main body, and a ferrule having a tapered end extending within said internal thread camming surface in inwardly radially spaced relation thereto so as to receive said shank segments thereabout in spaced relation, the steps comprising:

(1) inserting one end of said tubular plastic member in said cap bolt bore and receiving said ferrule tapered end therein in surface engaging relation with the tubular plastic member inner wall;

(2) moving the one end of said tubular plastic member axially over said ferrule tapered end, circumferentially expanding the portion of said tubular plastic member to accommodate said ferrule tapered end increase in diameter;

(3) turning said cap bolt to thread the external thread camming surface of the shank segments into the internal thread camming surface of the main body until the cap bolt head engages one end of the main body and by concurrent engagement of the tubular plastic member outer wall and the internal surface of the shank segments within the external thread camming surface moving the shank segments outwardly in cantilever fashion during said turning;

(4) and further turning said cap bolt to cam said shank segments inwardly in cantilever fashion into gripping engagements with said tubular plastic member and radially force said tubular plastic member more tightly into surface engagement with said ferrule one end, sealing and gripping said tubular plastic member against leakage relative to said ferrule and against removal from said fitting main body.

* * * * *